United States Patent [19]
Prockup

[11] Patent Number: 6,125,270
[45] Date of Patent: Sep. 26, 2000

[54] VERIFICATION SYSTEM FOR TRANSMITTERS AND COMMAND TONE GENERATORS

[75] Inventor: Kenneth M. Prockup, Emmaus, Pa.

[73] Assignee: The United States of America as represented by the Secretary of the Navy, Washington, D.C.

[21] Appl. No.: 09/014,512

[22] Filed: Jan. 28, 1998

[51] Int. Cl.$^7$ ............................... H04B 1/06; H04B 7/00
[52] U.S. Cl. .................. 455/234.1; 455/130; 455/245.1
[58] Field of Search ................................ 455/130, 226.1, 455/226.2, 226.3, 226.4, 227, 234.1, 245.1, 232.1, 334; 341/155

[56] References Cited

U.S. PATENT DOCUMENTS

| | | | |
|---|---|---|---|
| 2,958,772 | 11/1960 | Mandel | 375/345 |
| 3,188,571 | 6/1965 | Michael | 455/219 |
| 4,186,351 | 1/1980 | Brefini et al. | 455/226.2 |
| 4,313,218 | 1/1982 | O'Donnell, Jr. et al. | 455/239.1 |
| 5,072,358 | 12/1991 | Lankford | 700/73 |
| 5,732,342 | 3/1998 | Roth et al. | 455/234.1 |
| 5,745,847 | 4/1998 | Matsuo | 455/234.1 |
| 5,793,319 | 8/1998 | Ard | 341/120 |

*Primary Examiner*—William G. Trost
*Assistant Examiner*—Erika A. Gary
*Attorney, Agent, or Firm*—Ron Billi

[57] ABSTRACT

A system for verifying the operational performance of command tone generators, transmitters, and antennas including its signal quality and strength as well as its reflected power is disclosed. The system includes a receiver that receives a RF signal and develops an output AM demodulated signal having a d.c. component that is proportional to the amplitude of the received RF signal. The d.c. component serves as an AGC input for the receiver so as to hold the AM demodulated signal constant within a specified range for the input RF signal. The AGC value is digitized to form tuned RF power in sync with the address detection with a microprocessor correcting for AGC nonlinearities.

11 Claims, 6 Drawing Sheets

FIG-5F ic # VERIFICATION SYSTEM FOR TRANSMITTERS AND COMMAND TONE GENERATORS

BACKGROUND OF THE INVENTION

1. Field of the Invention

The present invention relates to a verification system for RF equipment and, more particularly, to a verification system for an ultra high frequency (UHF) downlink system that includes transmitters and command tone generators and verifies the quality of the signals utilized therein.

2. Description of the Prior Art

A verification system for a UHF downlink equipment typically includes a RF spectrum analyzer that is used to measure the tuned RF radiated power of a transmitter, and a directional RF power meter that is used to measure the forward and reflected power of an antenna. The forward power provides an indication of the performance of the transmitter, whereas the reflected power gives an indication of the performance of the antenna, that is, impedance mismatch related to an antenna, a broken feed connector or other problems related to an antenna and its associated equipment. The typical verification system has limitations such that the transmitter power measurements are not synchronized or sampled with the address tones related to the command tone generator also part of the UHF downlink equipment whose performance is interlinked to the transmitter. In addition, the typical verification system lacks the features of measuring and displaying the sonar frequency characteristics as well as analyzing the actual ping command in the sonar information. It is desired that a verification system be provided that does not suffer the limitations of previous systems, but rather provides for synchronized measurement of transmitted power in conjunction with the measurement and detection of the address tones of the command tone generator of the UHF verification system. Further, it is desired to provide the ability to detect and analyze the quality of the associated signals, e.g., ping information contained in the sonar information.

OBJECTS OF THE INVENTION

It is a primary object of the present invention to provide a system that verifies the operation of command tone generators, transmitters, and antenna determining their signal quality, their signal strength and their reflected power parameters.

It is a further object of the present invention to provide for a verification system that not only measures the RF power received by a receiver, but also corrects for any non-linearity that the detected RF power may have been encountered during its derivation.

Another object of the present invention is to provide for a verification system that not only detects the sonar information, but verifies the quality of the signals therein, e.g., the quantity of the ping signal.

SUMMARY OF THE INVENTION

The present invention is directed to a system for verifying the operational performance of a command tone generator, a transmitter, and an antenna including its signal quality and signal strength, as well as its reflected power parameter.

The system comprises a receiver having a frequency generator, an antenna, a RF amplifier, a mixer, an IF amplifier, and a video detector. The frequency generator provides an output a.c. signal at a first predetermined frequency. The antenna receives an RF signal having a second predetermined frequency and provides an output thereof. The RF generator has a first automatic gain control (AGC) circuit and first and second inputs and generates an output signal. The first input is connected to the output of the antenna and the second input is connected to receive the signal to which the first AGC circuit is responsive. The mixer has first and second inputs, with the first input connected to the output of the frequency generator and the second input connected to the output of the RF amplifier. The mixer generates an intermediate frequency (IF) signal having a frequency which is representative of the difference between the first and second predetermined frequencies. The IF amplifier has a second automatic gain control (AGC) circuit and first and second inputs, with the first input connected to the output of the mixer and the second input connected to a signal to which the second AGC circuit is responsive. The video detector is connected to the output of the IF amplifier and generates an output amplitude modulated (AM) demodulated signal with a corresponding amplitude and having a d.c. component that is proportional to the corresponding amplitude. The output of the video detector is connected to the second input of each of the RF and IF amplifiers and is responded to by the first and second automatic gain control (AGC) circuits therein.

BRIEF DESCRIPTION OF THE DRAWINGS

These and other objects, features and advantages of the invention, as well as the invention itself, become better understood by reference to the following detailed description when considered in conjunction with the accompanying drawings wherein like reference numbers designate identical or corresponding parts throughout and wherein:

FIG. 5 is composed of FIGS. 5(A), 5(B), 5(C), 5(D), 5(E), and 5(F), displaying plots of various tests associated with the UHF command downlink of the present invention.

DETAILED DESCRIPTION OF THE PREFERRED EMBODIMENTS

Figure 1A:
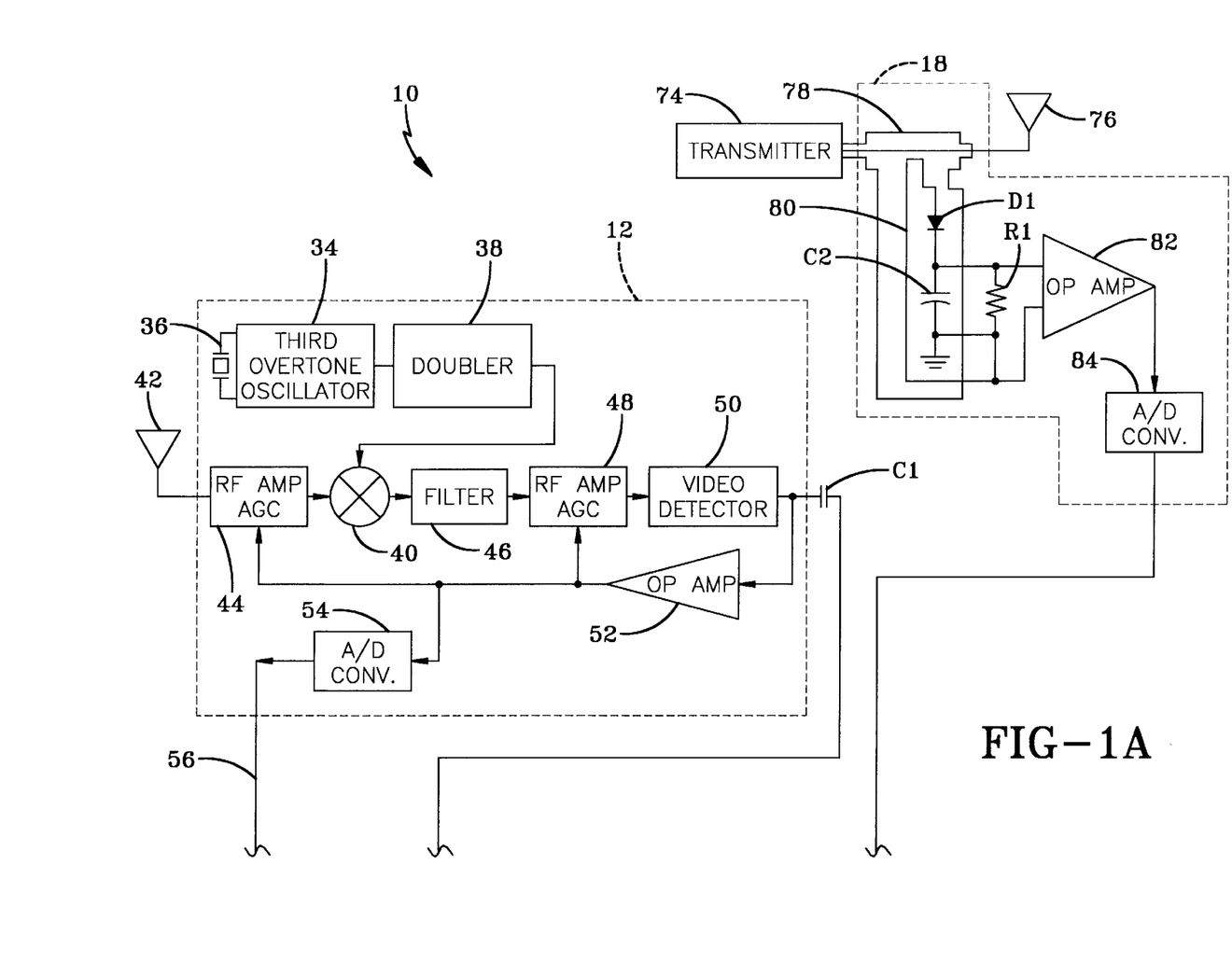
FIG. 1 is a block diagram of the verification system 10 of the present invention.
Figure 1B:
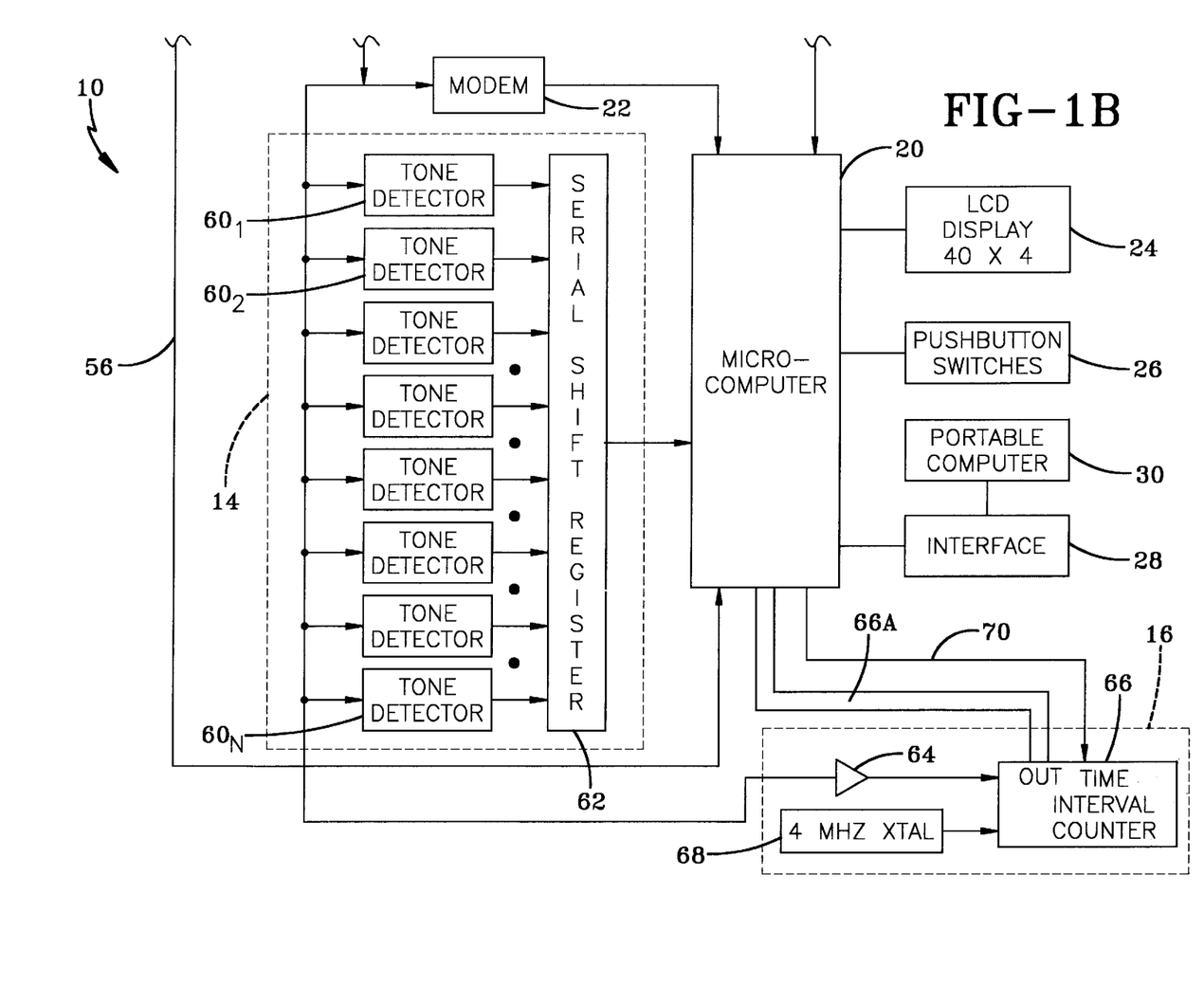

Referring to the drawings, there is shown in FIG. 1 a block 15 diagram of a system 10 of the present invention for verifying the operational performance of command tone generators, transmitters, and an antenna including its signal quality and strength, as well as its reflected power, all associated with a UHF downlink command system. The system 10 includes a receiver 12, an address detection network 14, a sonar ping collection network 16, a directional coupler network 18, and a microcomputer 20.

The microcomputer 20 services peripheral equipment, that is, a modem 22, an LCD display 24 having a typical matrix of 40×4 devices, pushbutton switches 26, and an interface 28. The LCD display 24 is interfaced to the microcomputer 20 via a 8255 parallel port. The interface 28 may be a serial interface RS 232 that interconnects the microcomputer 20 to other peripheral equipment, such as a portable computer 30 may be a lap-top type.

The microcomputer 20 may be a Zilog 64180 microprocessor, 32 k bytes EPROM, 32 k battery backup RAM, and utilize an Intel 8255 (24 bit I/O). The Zilog 64180 is a superset of the Zilog Z80 having a built-in memory management (512 K bytes) and two built-in serial ports, one dealing with the interface 28 and the other dealing with handling and decoding command function select (CFS) command, which are digital commands commonly associated with sonar buoy equipment, and provided to microcomputer 20 by way of the modem 22 which may be a 1200 baud type. The microcomputer 20 also services the output of the receiver 12.

The receiver 12 comprises a frequency generator which in turn comprises a third overtone oscillator 34, a frequency source 36, and a frequency doubler 38. The third overtone oscillator 34 responds to the frequency source 36 having a predetermined frequency. The frequency source 36 may be a 50 MHz crystal. The third overtone oscillator may be a Colpitt generator operating on the third overtone of the 50 MHz frequency. The output of the third overtone oscillator 34 is fed to a frequency doubler 38 which, in turn, routes its output to the first input of a mixer 40 having a second input.

The receiver 12, in particular, the antenna 42 receives a RF signal to be analyzed and having a first predetermined frequency and the antenna 42 provides an output a.c. signal to a first input of the RF amplifier 44 having a second input and an automatic gain control (AGC) circuit. The second input of the RF amplifier (amp) 44 is connected to receive a signal to which the first AGC circuit is responsive. The RF amplifier 44 may be a MFE 121 dual gate MOSFET transistor made available from Motorola. The RF amplifier 44 generates an output signal that is routed to the second input of the mixer 40.

The mixer 40 generates an intermediate frequency (IF) output signal having a frequency which represents the difference between its first and second predetermined frequency, that is, the frequency difference between the signals present on its first and second inputs. The output of the mixer 40 is preferably provided to a filter 46 which is preferably a ceramic type filter having a center frequency of 10.7 MHz. The filter 46 provides an output signal that is routed to an IF amplifier 48.

The IF amplifier 48 may be a Motorola MC1349P and has a second automatic gain control (AGC) circuit and first and second inputs, with the first input connected to the output of the filter 46 and the second input connected to receive the signal to which the second AGC circuit is responsive. The IF amplifier 48 generates an output signal that is applied to the input of a video detector 50.

The video detector 50 may be of the type MC1330A made available from Motorola. The video detector 50 acts a demodulator and provides an amplitude modulator (AM) demodulated output having a d.c. component. The d.c. component of the output of the video detector 50 is proportional to the amplitude of the IF signal received from the IF amplifier 48. This d.c. voltage is routed, preferably by way of an operational amplifier 52, to both of the second inputs of the RF and IF amplifiers 44 and 48 respectively. The AGC circuits of the RF and IF amplifiers 44 and 48 provides for a constant demodulated output for the video detector 50 that follows an RF input, received by antenna 42, in the range of −15 dB and to −85 dBm. This demodulated output of the video detector 50 is routed to the microcomputer 20 for analysis thereof for difference purposes, the first of which is for a correction table and the information is supplied therefor via an analog-to-digital (A/D) converter 54 which may be part of the microcomputer 20.

The analog-to-digital (A/D) converter 54 is connected to the output of the operational amplifier 52 which, in turn, provides a 10 bit output that is routed to the microcomputer 20 via signal path 56. The microcomputer 20 operates in response to routines so as to derive a correction look-up table that converts the 10 bit output from the A/D converter 54 to tuned RF power quantities stored in the look-up table. The look-up table may be further described with reference to FIG. 2.

Figure 2:
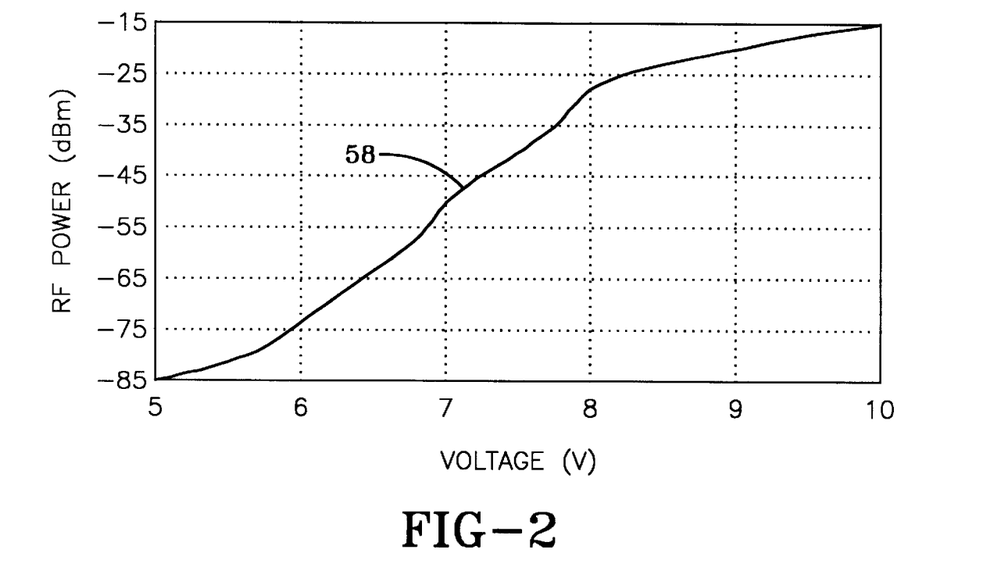
FIG. 2 illustrates an AGC correction voltage plot to compensate for the non-linearity function of the RF signal processed by the system 10 of FIG. 1.

As seen in FIG. 2, the look-up table correlates the tuned RF power (dBm) to the voltage (V), with the voltage (V) representative of the d.c. output of the video detector 50. The look-up table of FIG. 2 allows the apparent RF power to be converted to the actual or correct RF power so as to compensate for the non-linearity of the response of both the RF amplifier 44 and the IF amplifier 48. The microcomputer 20 also operatively interacts with the address detection network 14 which is interconnected to the receiver 12 by way of the capacitor C1 having a typical value of 0.47 μFd.

The address detection logic comprises a plurality of tone detectors $60_1$, $60_2$ . . . $60_N$ and preferably a serial shift register 62 interposed between each of the plurality of tone detectors $60_1$, . . . $60_N$ and the microcomputer 20. The detectors $60_1$ . . . $60_N$ may be of the LM567 tone decoder made available from National Semiconductor. Each of the tone decoders $60_1$ . . . $60_N$ detects a particular address frequency related to a particular command tone generator that is part of the UHF downlink system related to the present invention.

In general, each of the tone detectors $60_1$ . . . $60_N$ consists of a phased-locked loop system which locks up on a steady frequency within its lock-up range. The components of each of the tone detectors $60_1$ . . . $60_N$ are selected so that each tone detector $60_1$ . . . $60_N$ provides a respective address frequency within the range of ±400 Hz range. Each of the tone detectors $60_1$ . . . $60_N$ provides for a lock-in value output which is fed in parallel via the serial shift register 62 to the microcomputer 20. The microcomputer 20 contains routines so as to be responsible for determining the address tones having appropriate timing sequences related to a particular command tone generator and such routines preferably take into account the captured time and RC delay time of each of the tone decoders $60_1$ . . . $60_N$. Further, the microcomputer 20 has routines that are operatively interact with the sonar ping collection network 16.

The sonar ping collection network 16 comprises a comparator 64 arranged to serve as a zero crossing detector, an interval timer 66, and a frequency source 68 which may be a 4 MHz crystal. The zero detector 64 may be of the type LM311 made available from National Semiconductor and the interval timer 66 may be a programmable interval timer made available from Intel as their 82C54 programmable interval timer. The sonar ping collection network 16 is activated by signal 70 which is an activation signal and generated by the microcomputer 20 upon the identification of 25 any of the address codes of the tone detectors $60_1$ . . . $60_N$ already discussed with regard to the address detection logic 14. More particularly, upon the detection of a valid address tone by the routines operating in the microcomputer 20, signal 70 is generated by the microcomputer 20 which, in turn, activates the time interval counter 66.

The time interval counter 66 has first and second inputs, with the first input being the output of zero crossing detector 64 and the second input being connected to the activation signal 70. The time interval counter 66 measures the time between the zero crossings of the first input, initiated by the second input and sends a table of the results thereof via its output 66A to the microcomputer 20 for a period of time which may last one second.

Figure 3:
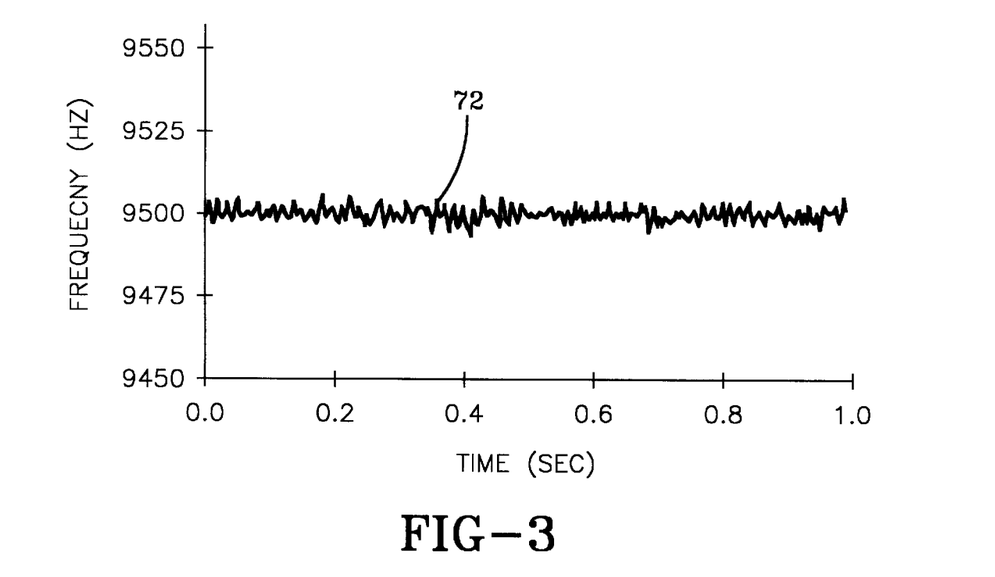
FIG. 3 is a plot related to the frequency of the sonar pings processed by the system 10 of FIG. 1.

The microcomputer 20 has routines having a look-up table that may be further described with reference to FIG. 3 that illustrates a response 72 which is a plot of frequency vs. time, with the time quantities corresponding to the time difference measured by the interval counter 66 previously discussed. These time quantities are converted to frequency so as to correct for any uncertainties in the sonar ping frequency. This response 72 is also used to determine the type of ping that is the ping quantity related to various sonar equipment utilizing a continuous wave, a frequency modulation, or hyperbolic or hoop parameters associated with sonar systems known in the art. The quality of the ping signal may be determined by expression (1) given below:

$$S_q = \frac{8000 \cdot \sum_{i=2}^{n} |f_1 - f_{i-1}|}{f_{avg} \cdot (n-1).} \quad (1)$$

where $f_1$=instantaneous frequency of the sweep parameter of the ping quantity, $f_{avg}$=average frequency of the sweep parameter of the ping quantity, n=number of data points gathered for FIG. 3 and Sq equals the quality of the ping quantity.

The quantity $8000/f_{avg}$ is used to scale the results and allow the quality number related to expression 1 to be unitless. The microcomputer 20 has further routines that are responsive to the activation signal 70 and that are related to the directional coupler network 18.

The directional coupler network 18 is interposed between a transmitter 74 and a transmitting antenna 76 and is comprised of a directional coupler 78 which is commercially available from Bird Electronic Corporation as their type 43-25D. In general, the directional coupler 78 comprises a RF wire 80 that is connected in series to a diode D1 which, in turn, is connected to a capacitor C2 having a typical value of 0.01μFd which, in turn, is connected to ground. The diode (D1) and capacitor (C2) are arranged as shown and form a RF detector and provide an output thereof that is routed to a shunt resistor Ri having a typical value of 1,400 ohms. The output of the RF detector is routed to an operational amplifier 82 which, in turn, provides a d.c. output signal to an A/D converter 84 which, in turn, provides a digital representation thereof to the microcomputer 20.

The directional coupler 78 has a mutual inductance which is a directional component, and also has a mutual capacitance that is independent of direction. As used herein, a directional component is meant to represent the direction of wave propagating down a transmission line. Because of the mutual inductance and capacitance of the directional coupler 78, the inductance and capacitive energy of the output of directional coupler 78 add in one direction to the associated RF traveling wave. The energy of the inductance will subtract from the capacitance in the other direction of the RF traveling wave. The d.c. output of the RF detector of the directional coupler 78 is exponentially proportional to the RF power feeding the directional coupler 78 in a forward direction. This exponential relationship is illustrated in FIG. 4.

Figure 4:
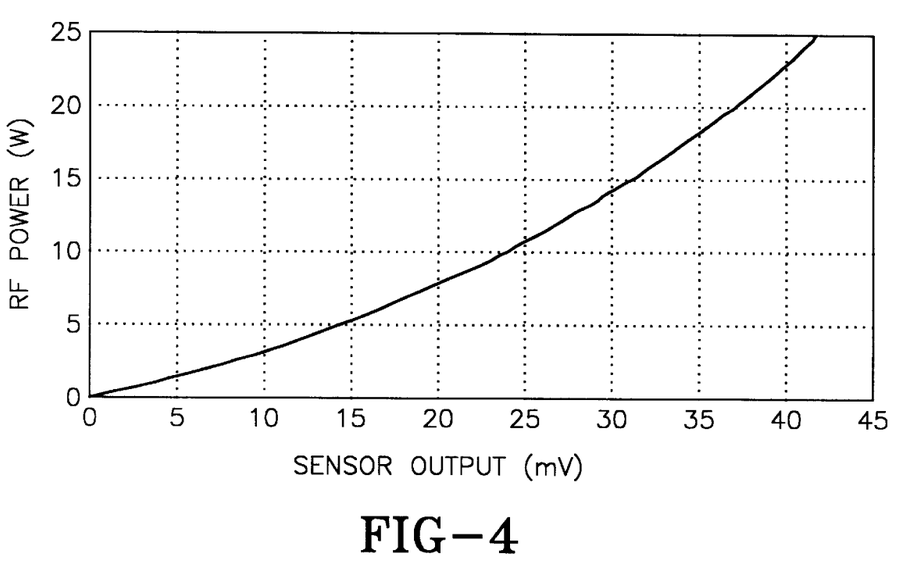
FIG. 4 is a plot of the directional couplers' response associated with the system 10 of the present invention.
Figure 5A:
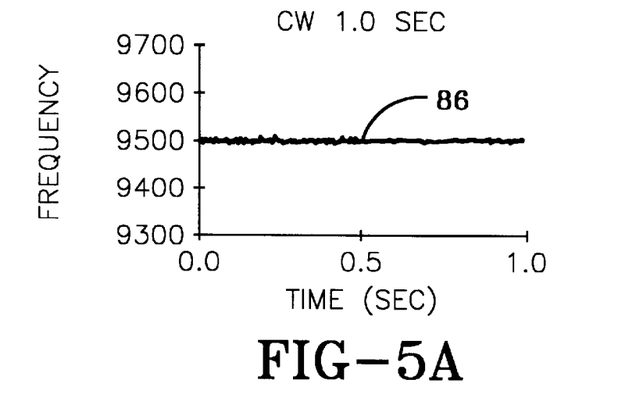
Figure 5B:
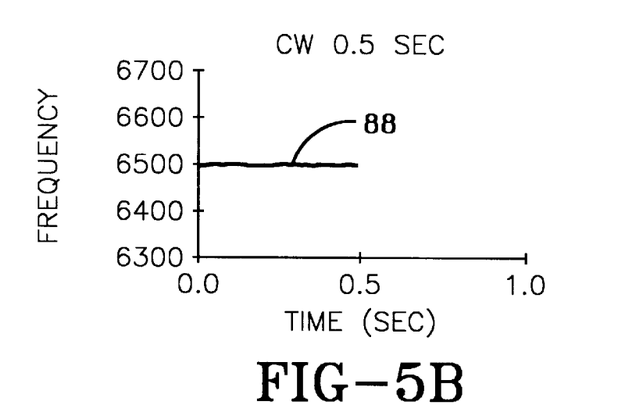
Figure 5C:
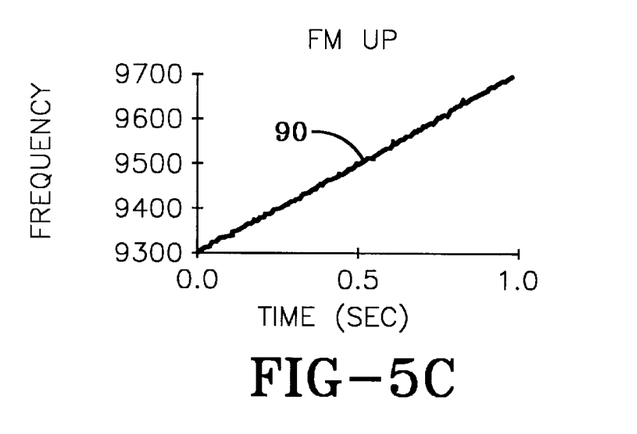
Figure 5D:
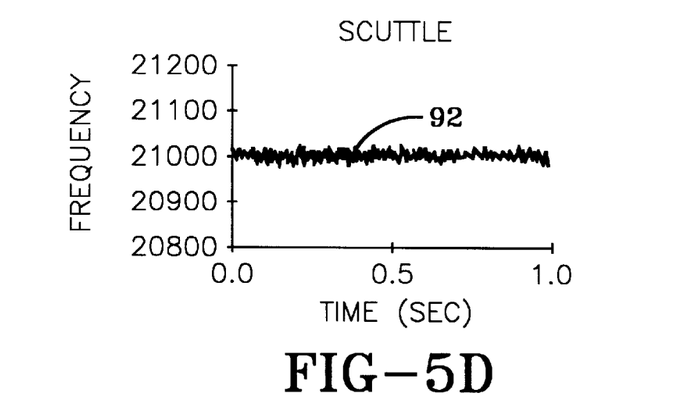
Figure 5E:
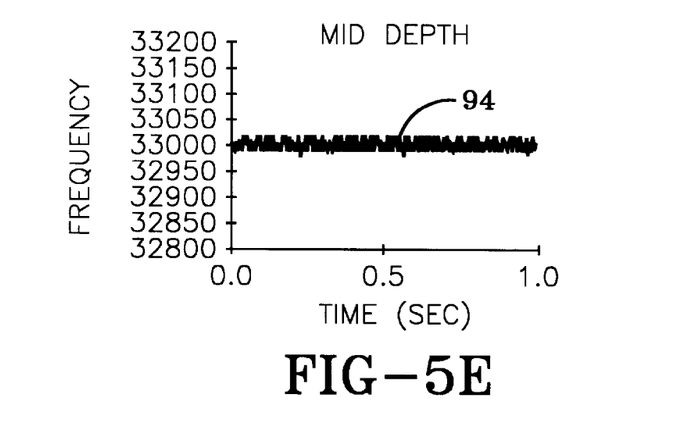
Figure 5F:
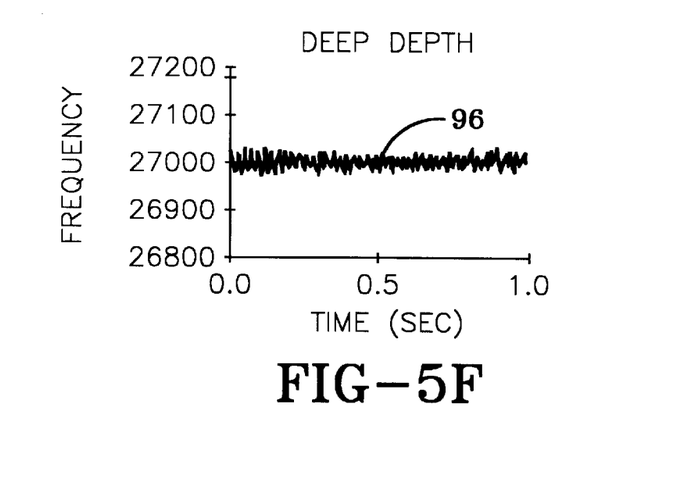

To derive the response of FIG. 4, the microcomputer 20 collects digital quantities from the output of the A/D converter 84 during a sonar ping, but after a valid address tone is detected in a manner as previously described for the activation signal 70. The microcomputer 20 converts the A/D values to power using expression (2) given below:

$$P_{rf} = 259 \cdot v + 5092 \cdot v^2 + 67608 v^3 \quad (2)$$

where $P_{rf}$=RF power in watts and v=output of the RF detector of the directional coupler 78.

It should now be appreciated that the practice of the present invention provides for a system that verifies the operation of a command tone generator, a transmitter, and an antenna with regard to its signal quality, its RF signal strength and its reflected power. The system 10 provides for such measurements in synchronization with the address code received which is contained in the RF signal received by antenna 42.

The microcomputer 20 by its ability of serving interface 28 allows for the results of various testing to be displayed on the portable computer 30 and such results are generally illustrated in FIG. 5 comprised of FIGS. 5(A), 5(B), 5(C), 5(D), 5(E), and 5(F), respectively showing plots 86, 88, 90, 92, 94, and 96 associated with various operating scenarios of a sonar system.

It should now be appreciated that the practice of the present invention also provides for a convenient way of displaying the results of testing typically performed on a UHF down link system and the monitoring thereof.

It is understood that the invention is not limited to the specific embodiments herein illustrated and described but may be otherwise without departing in the spirit and scope of the invention.

What I claim is:

1. A receiver comprising:
   (a) a frequency generator that provides an output a.c. signal at a first predetermined frequency, wherein said frequency generator comprises:
      (i) a Colpitt generator responsive to a frequency source having a preselected frequency and operating on a third overtone of said preselected frequency and generating an output thereof; and
      (ii) a frequency doubler receiving the output of said Colpitt generator and generating said output a.c. signal of said frequency generator
   (b) an antenna for receiving a RF signal having a second predetermined frequency and providing an output thereof;
   (c) an RF amplifier having a first automatic gain control (AGC) circuit and first and second inputs and generating an output signal, said first input being connected to said output of said antenna and the second input being connected to receive a signal to which said first AGC circuit is responsive;
   (d) a mixer having first and second inputs with the first input connected to the output of said frequency generator and the second input connected to the output of said RF amplifier, said mixer generating an intermediate frequency (IF) signal having a frequency which represents the difference between said first and second predetermined frequencies;
   (e) an IF amplifier having a second automatic gain control (AGC) circuit and first and second inputs and generates an output signal, said first input being connected to said output of said mixer and the second input being connected to receive a signal to which said second AGC circuit is responsive; and
   (f) a video detector connected to said output of said IF amplifier and generating an output amplitude modulated (AM) demodulated signal with a corresponding amplitude and having a d.c. component that is proportional to the said corresponding amplitude, said output of said video detector connected to said second input of each of said RF and IF amplifiers.

2. The receiver according to claim 1, wherein said frequency source is a 50 MHz crystal.

3. The receiver according to claim 1 further comprising a filter having a preselected bandpass and interposed between said mixer and said IF amplifier.

4. The receiver according to claim 1 further comprising an operational amplifier having an output and interposed between the output of said video detector and said second input of each of said RF and IF amplifiers.

5. The receiver according to claim 4 further comprising an analog-to-digital converter having an input and an output with the input connected to said output of said operational amplifier.

6. The receiver according to claim 5, wherein said analog-to-digital converter provides a ten (10) bit output and wherein said receiver further comprises a microcomputer having a plurality of inputs with one input connected to said ten (10) bit output of said analog-to-digital converter, said microprocessor, having a correction look-up table and that receives said 10 bit output and operates in response to routines that converts said 10 bit output to an RF power stored in said correction look-up table.

7. A receiver comprising:

(a) a frequency generator that provides an output a.c. signal at a first predetermined frequency;

(b) an antenna for receiving a RF signal having a second predetermined frequency and providing an output thereof;

(c) an RF amplifier having a first automatic gain control (AGC) circuit and first and second inputs and generating an output signal, said first input being connected to said output of said antenna and the second input being connected to receive a signal to which said first AGC circuit is responsive;

(d) a mixer having first and second inputs with the first input connected to the output of said frequency generator and the second input connected to the output of said RF amplifier, said mixer generating an intermediate frequency (IF) signal having a frequency which represents the difference between said first and second predetermined frequencies;

(e) an IF amplifier having a second automatic gain control (AGC) circuit and first and second inputs and generates an output signal, said first input being connected to said output of said mixer and the second input being connected to receive a signal to which said second AGC circuit is responsive;

(f) a video detector connected to said output of said IF amplifier and generating an output amplitude modulated (AM) demodulated signal with a corresponding amplitude and having a d.c. component that is proportional to the said corresponding amplitude, said output of said video detector connected to said second input of each of said RF and IF amplifiers.

(g) a capacitor having first and second ends with the first end connected to said output of said video detector;

(h) a plurality of detectors each having a predetermined frequency range for detecting an address tone and providing a representative output signal thereof, each of said plurality of detectors connected to said second end of said capacitor; and (i) a microcomputer receiving each of said output of each of said plurality of said detector and operating in response to routines that correlate and identify any address tone to a predefined RF signal source.

8. The receiver according to claim 7, wherein said microcomputer has a serial port for receiving said outputs of said plurality of detectors and said receiver further comprises a serial shift register operatively interposed between each of said plurality of detectors and said serial port of said microcomputer.

9. The receiver according to claim 7, wherein said microcomputer has a sonar ping table and generates an activation signal upon identification of any address code and wherein said receiver further comprises:

(a) a zero crossing detector connected to said second end of said capacitor and generating an output upon the detection of a zero-cross over condition of said output of said video detector crossing zero; and (b) an interval timer having first and second inputs with the first input connected to the output of said zero crossing detector and the second input connected to said activation signal of said microcomputer, said interval timer measuring the time between the occurrence of the zero crossing on the first input, initiated by the second input and sending the results thereof to said microcomputer for deriving said sonar ping table.

10. The receiver according to claim 9, wherein the signal quality contained in said derived said sonar ping table is determined by the below expression:

$$S_q = \frac{8000 \cdot \sum_{i=2}^{n} |f_i - f_{i-1}|}{f_{avg} \cdot (n-1)}.$$

where $f_i$=instantaneous frequency of the sweep of the sonar ping, $f_{avg}$=average frequency of the sweep of the sonar ping, n=number of data points included in said sonar ping table, and $S_q$ equals the signal quality result.

11. A system according to claim 9 for measuring the power of a RF signal comprising:

(a) a directional coupler having input and output stages with the input stage receiving a RF signal containing RF power and the output stage having a detector that provides a d.c. output that is exponentially proportional to said RF power of said received RF signal;

(b) an analog-to-digital converter receiving said d.c. output and providing an output digital representation thereof; and (c) said microcomputer further comprising routines responsive to said activation signal and receiving and converting said output digital representation to said RF power using the below expression:

$$P_{rf} = 259 \cdot v + 5092 \cdot v^2 + 67608 v^3$$

where $P_{rf}$=RF power in watts and v=directional coupler output in volts.

* * * * *